United States Patent [19]

Masuda et al.

[11] Patent Number: 5,529,426

[45] Date of Patent: Jun. 25, 1996

[54] HOUSING BLOCK-RETAINING CONSTRUCTION

[75] Inventors: Satoki Masuda; Takashi Ishii; Tamio Watanabe; Toru Nagano; Takayoshi Endo, all of Haibara-gun, Japan

[73] Assignee: Yazaki Corporation, Tokyo, Japan

[21] Appl. No.: 213,059

[22] Filed: Mar. 15, 1994

Related U.S. Application Data

[63] Continuation-in-part of Ser. No. 965,021, Oct. 23, 1992, Pat. No. 5,328,288.

[30] Foreign Application Priority Data

Oct. 24, 1991 [JP] Japan ......................................... 3-87210
Jun. 8, 1993 [JP] Japan ....................................... 5-137393

[51] Int. Cl.⁶ ............................ H01R 13/627; B25G 3/18
[52] U.S. Cl. .......................... 403/329; 403/326; 439/353
[58] Field of Search .............................. 70/401; 174/52.1;
200/295; 439/353, 354, 133, 372, 345,
355, 367; 248/221.3, 224.3; 403/326, 329,
321

[56] References Cited

U.S. PATENT DOCUMENTS

| 91,610 | 6/1869 | Crosby | 70/401 |
|---|---|---|---|
| 398,392 | 2/1889 | Harker | 70/401 |
| 1,320,028 | 10/1919 | Sardo | 70/401 |
| 1,508,058 | 9/1924 | Komorous | 70/401 |
| 1,545,962 | 7/1925 | Klein | 70/401 |
| 3,971,237 | 7/1976 | Rasmussen | 70/401 |
| 4,674,814 | 6/1987 | Hoshino et al. | 439/372 |
| 4,884,978 | 12/1989 | Inabe et al. | 439/354 |
| 4,988,553 | 1/1991 | Saiki et al. | 200/295 |
| 5,022,075 | 6/1991 | Beauval | 439/133 |
| 5,172,998 | 12/1992 | Hatagishi | 403/322 |
| 5,178,552 | 1/1993 | Jinno et al. | 439/345 |
| 5,190,466 | 3/1993 | McVey | 70/58 |
| 5,390,515 | 2/1995 | Essick | 70/57.1 |

FOREIGN PATENT DOCUMENTS

| 2355509 | 1/1984 | Germany . | |
|---|---|---|---|
| 50107986 | 9/1975 | Japan . | |
| 56-117481 | 9/1981 | Japan . | |
| 0189877 | 7/1989 | Japan | 439/354 |

Primary Examiner—Barnell M. Boucher
Attorney, Agent, or Firm—Sughrue, Mion, Zinn, Macpeak & Seas

[57] ABSTRACT

An object of the present invention is to provide a housing block retaining construction which allows a release tool to be easily operated, and will not interfere with the withdrawal of a housing block. According to the present invention, there is provided that a housing block retaining construction comprises a retaining lance slanting in the insertion direction provided in an insertion opening of a housing holder, a notch in which a distal end of a release tool is engageable formed in a distal end of the retaining lance, a retaining projection for engagement with the retaining lance provided on a housing block, and a recess for allowing the release tool to pass therethrough formed in that portion of the retaining projection corresponding to the notch.

6 Claims, 5 Drawing Sheets

HOUSING BLOCK-RETAINING CONSTRUCTION

BACKGROUND OF THE INVENTION

This is a Continuation-in-Part Application of pending prior application Ser. No. 07/965,021 now U.S. Pat. No. 5,328,288 filed on Oct. 23, 1992 of Satoki Masuda entitled HOUSING BLOCK RETAINING CONSTRUCTION.

FIELD OF THE INVENTION

This invention relates to a construction for retaining a housing block inserted in an insertion opening formed in a housing holder, the housing block having terminal receiving chambers for respectively receiving terminals each having an electric wire connected thereto and relates to a retainment releasing tool used in such a structure that a housing block having wired terminals therein is retained in a housing holder in order to take the housing block out of the housing holder by releasing the retainment.

RELATED ART

A retaining construction for retaining a housing block inserted in an insertion opening formed in a housing holder is disclosed, for example, in Unexamined Japanese Utility Model Application No. 50-107986.

Referring to this conventional art, as shown in Figs. 6 and 7, a plurality of housing blocks 1 are inserted respectively into juxtaposed insertion openings 3 provided in a housing holder 2, each housing block having a generally rectangular parallelepipedic contour and having terminal receiving chambers (not shown) therein.

Retaining steps 4 are formed respectively on opposed inner wall surfaces 3a at the inlet side of the insertion opening 3, and retaining projections 5 which are abutted respectively against the retaining steps 4 when the housing block 1 is inserted into the insertion opening 3 are formed respectively on the opposite side surfaces of the housing block 1, thereby limiting the housing block 1 to a predetermined insertion depth.

A retaining construction for the housing block is provided at two inner wall surfaces 3b of the insertion opening 3 disposed perpendicular to the two inner wall surfaces 3a.

The housing block-retaining construction comprises retaining lances 7 each flexible or deformable by a slit 6, and a retaining projection 8 projected from the inner surface of each retaining lance 7. A slanting surface 8a progressively increasing in height in the direction of insertion of the housing block 1, as well as a retaining surface 8b disposed substantially perpendicular to the insertion direction, is formed on the retaining projection 8.

Therefore, as the housing block 1 is inserted into the insertion opening 3, the front end of the housing block 1 is abutted against the retaining projections 8, and the retaining lances 7 are flexed and deformed to allow the insertion of the housing block 1 because the retaining projections 8 are urged. When the housing block 1 is inserted a predetermined depth with the retaining projections 5 abutted against the retaining steps 4, the rear end of the housing block 1 passes past the retaining projections 8, so that the retaining lances 7 are elastically restored to engage the retaining surfaces 8b with the rear end of the housing block 1, thereby retaining the housing block 1.

When the housing block 1 retained by the retaining lances 7 is to be taken out of the housing holder 2, a distal end portion of a tool is inserted into the inlet of the insertion opening 3, and is pushed in a direction generally perpendicular to the insertion direction to flex the two retaining lances 7, and in this condition the housing block 1 must be withdrawn. However, it is difficult to push the distal end of the tool perpendicularly to the insertion direction in the inlet of the narrow insertion opening 3, and besides the pushed tool interferes with the withdrawal of the housing block 1, and therefore withdrawal operation is quite difficult.

SUMMARY OF THE INVENTION

An object of this invention is to overcome these problems, and is to provide a housing block-retaining construction which allows a release tool to be easily operated, and will not interfere with the withdrawal of a housing block.

Another object of the invention is to provide a tool capable of releasing a plurality of retained portions or taking a housing block out with a simple operation.

The above object has been achieved by a housing block-retaining construction comprising a housing block having terminal receiving chambers for respectively receiving terminals each having an electric wire connected thereto; and a housing holder having an insertion opening for receiving said housing block, said housing holder retaining said housing block inserted in said insertion opening; wherein a flexible retaining lance of the cantilever type is provided at an inlet side of said insertion opening of said housing holder, said retaining lance being slanted from an inner peripheral surface of said housing holder in a direction of insertion of said housing block; a notch in which a distal end of a release tool is engageable is formed in a distal end portion of said retaining lance; a retaining projection for engagement with said retaining lance is provided on said housing block; and a recess for allowing said release tool to pass therethrough is formed in that portion of said retaining projection corresponding to said notch.

To achieve the above object, the invention is applied to a retainment releasing tool for a housing block inside a housing holder, which includes: retaining projections having recesses on upper and lower surfaces of a housing block having terminals therein, each terminal having a wire connected thereto, and which is used in such a structure that when the housing block is inserted into an opening of a housing holder, distal end portions of flexible retaining lances arranged on upper and lower surfaces of the opening are engaged with the retaining projections with notches formed on the distal end portions confronting the recesses. The retainment releasing tool further includes: a pair of releasing plates confronting each other on a pushing portion; and retainment releasing projections having tapered drive surfaces on distal ends of the releasing plates.

In the above housing block-retaining construction, when the release tool is inserted, and is pressed against the notch in the distal end portion of the retaining lance, the distal end of the retaining lance elastically deformed by the pressure through the notch is spaced apart from the retaining projection, so that the housing block whose engagement is now released can be withdrawn.

The release tool is inserted in a direction opposite to the direction of insertion of the housing holder, and therefore this toll will not interfere with the withdrawal of the housing block, and the withdrawal can be effected easily.

As the retainment releasing tool is inserted into the housing holder in such a manner as to nip the housing block with the pair of releasing plates, the retainment releasing projections enter into the notches on the distal end portions of the retaining lances through the recesses between the retaining projections, respectively, which causes the tapered drive surfaces to drive the distal end portions to release the engagement of the housing block with the retaining projections. Under this condition, the pushing portion pushes the housing block out.

BRIEF DESCRIPTION OF THE INVENTION

DETAILED DESCRIPTION OF THE PREFERRED EMBODIMENTS

Figure 1:
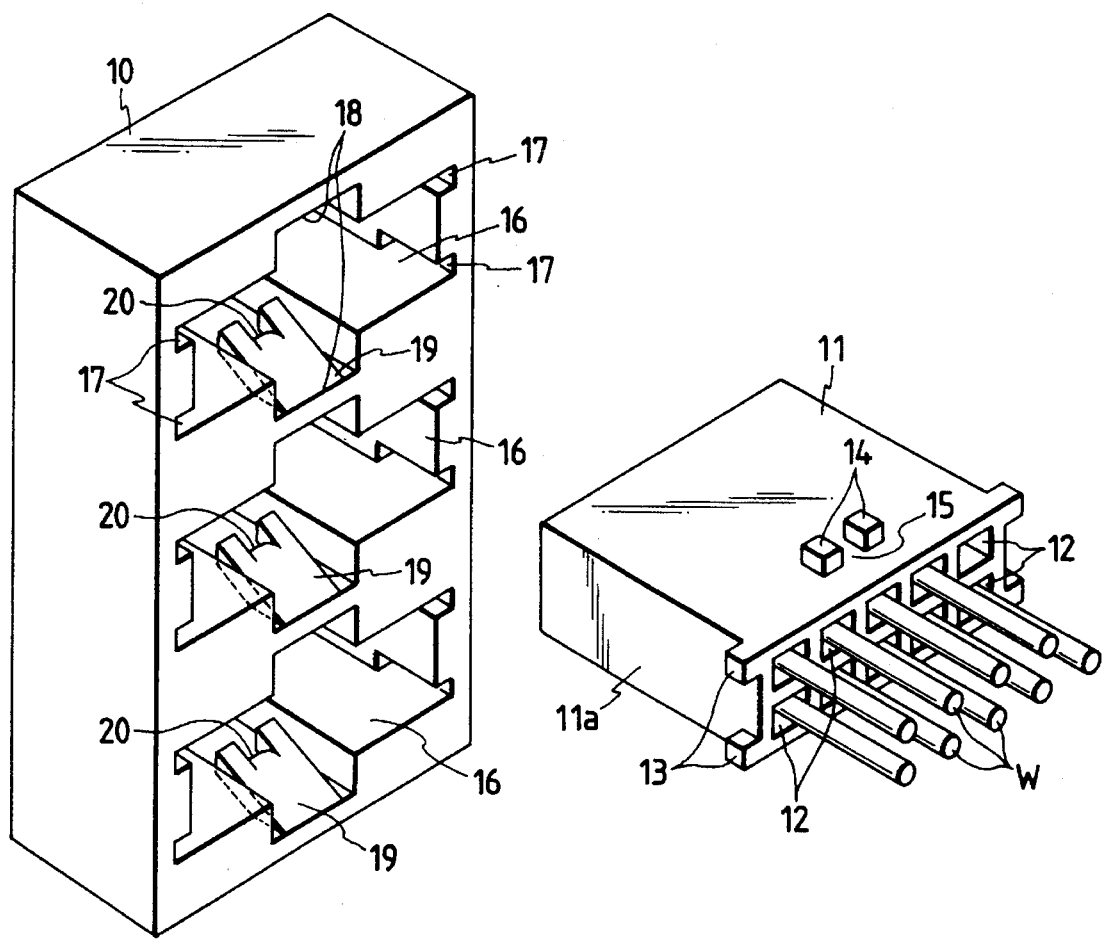
FIG. 1 is a perspective view showing a housing holder and a housing block of the present invention.
Figure 2:
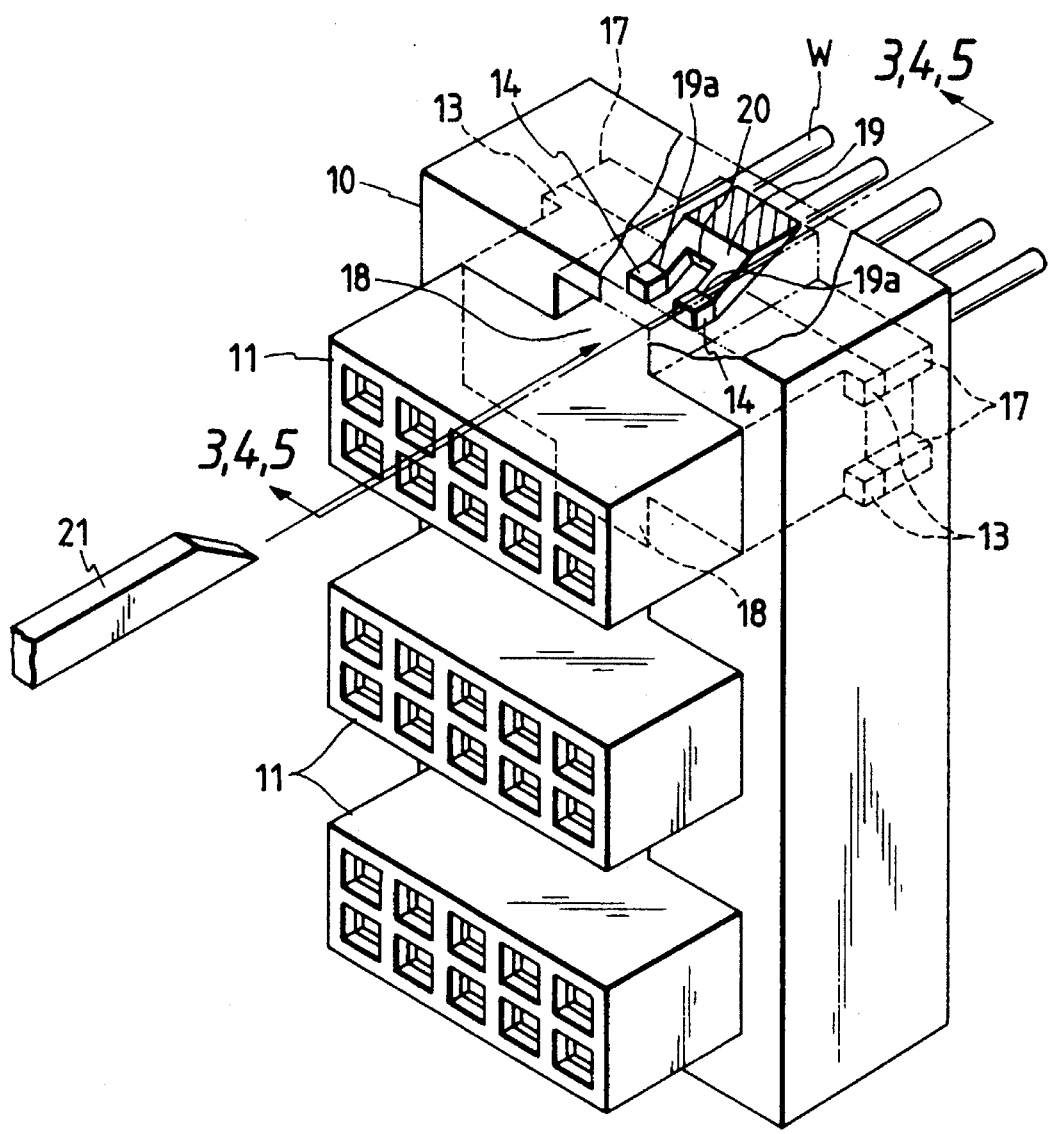
FIG. 2 is a partly-broken, perspective view of the housing holder with the housing blocks inserted therein.

A preferred embodiment of the present invention will now be described with reference to the drawings. FIG. 1 is a perspective view showing a housing holder 10 and a housing block 11, and FIG. 2 is a perspective view of the housing holder 10 with the housing blocks 11 inserted therein.

As shown in FIG. 1, the housing block 11 has a plurality of terminal receiving chambers 12 for respectively receiving terminals (not shown) each having an electric wire W connected thereto. Two stoppers 13 are formed on each of opposite side surface 11a of the housing block 11 at the rear side thereof. Two retaining projections 14 are formed on a central portion of each of upper and lower surfaces of the housing block 11, and are disposed adjacent to the rear side. A recess 15 is formed between the two retaining projections 14.

The housing holder 10 has three insertion openings 16 into which three housing blocks 11 are adapted to be inserted, respectively. Retaining steps 17 into which the stoppers 13 are adapted to be inserted to a predetermined depth, respectively, are provided at the opposed inner side wall surfaces of each insertion opening 16. An engagement groove 18 into which the retaining projections 14 can be inserted is formed in a generally central portion of each of upper and lower inner wall surfaces of each insertion opening 16, and the engagement groove 18 extends to the rear end face of the housing holder 10. A retaining lance 19 of the cantilever-type is provided in the engagement groove 18 at the housing block inserting side of the insertion opening 16, the retaining lance 19 being slanted in the direction of insertion of the housing block 11.

Figure 3:
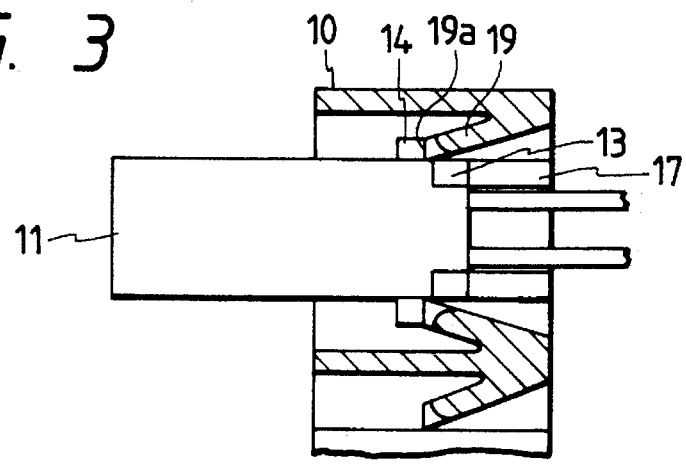
FIG. 3 is a vertical cross-sectional view of the housing block with the housing block inserted therein.
Figure 4:
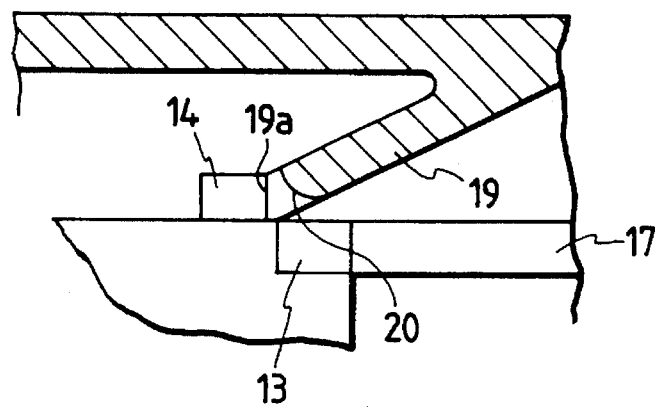
FIG. 4 is an enlarged view of a portion of FIG. 3.

The retaining lance 19 has a flexibility, and when the housing block 11 is to be inserted into the insertion opening 16, the retaining lance 19 is urged at its distal end portion 19a (see FIGS. 2 to 4) by the retaining projections 14, and therefore is flexed and deformed. When the housing block 11 is inserted the predetermined depth, the distal end portion 19a is elastically restored to be engaged with the rear end surfaces of the retaining projections 14.

A notch 20 is provided in that portion of the distal end portion 19a corresponding to the recess 15.

The operation of the above housing block-retaining construction will now be described with reference to the drawings.

As the housing block 11 is inserted into the insertion opening 16 of the housing holder 10, the distal end portions 19a are abutted against the retaining projections, and the retaining lances 19 urged by the retaining projections 14 are flexed and deformed, so that the insertion of the retaining projections 14 continues.

When the housing block 11 is inserted the predetermined depth with the stoppers 13 abutted against the respective retaining steps 17, the retaining projections 14 pass past the distal end portion 19a of the retaining lance 19, and the flexed retaining lance 19 is elastically restored, so that the distal end portion 19a is engaged with the retaining projections 14 (see FIGS. 2 to 4), thereby retaining the housing block 11 in the insertion opening 16.

Figure 5:
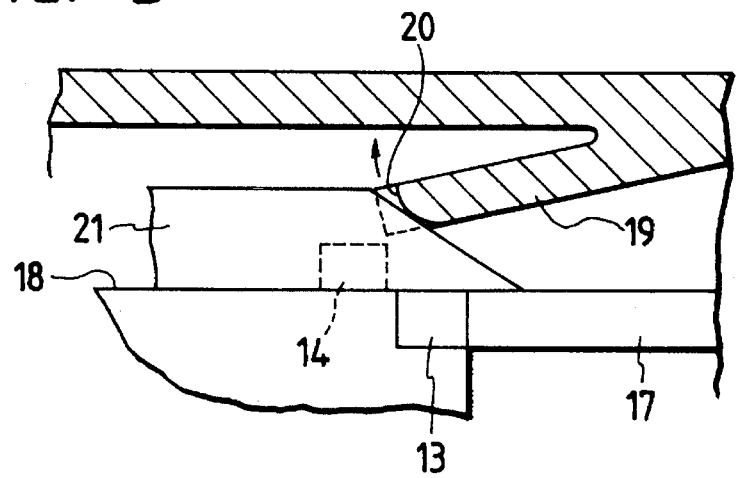
FIG. 5 is a vertical cross-sectional view of an important portion, showing the manner of releasing the engagement by the housing holder.
Figure 6:
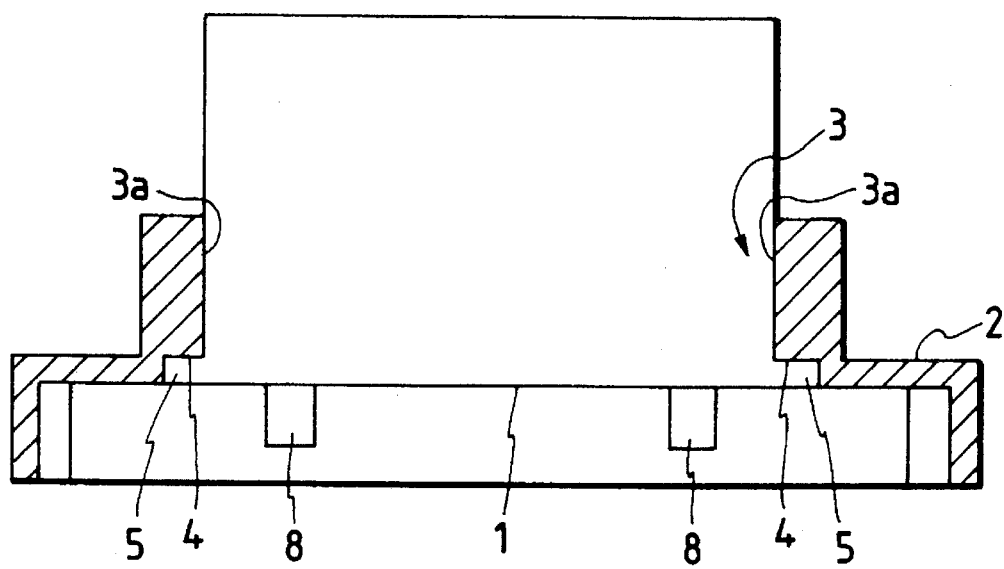
FIG. 6 is a vertical cross-sectional view of a conventional housing block-retaining construction.
Figure 7:
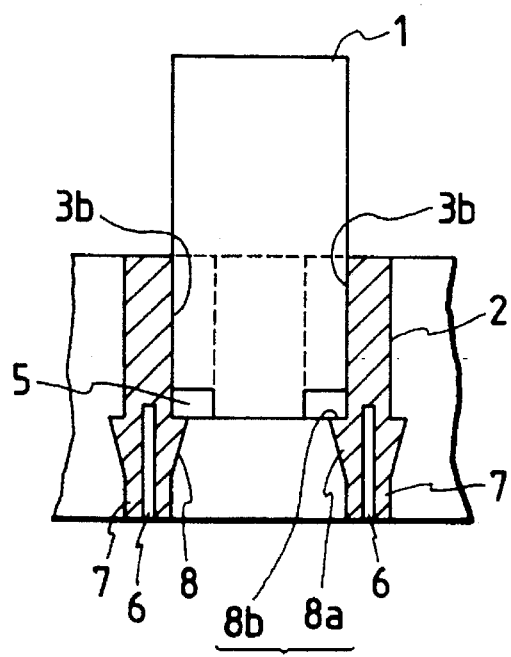
FIG. 7 is a horizontal cross-sectional view of the construction of FIG. 6.

When the housing block 11 is to be taken out of the housing holder 10, a release tool 21 is inserted into the engagement groove 18 from a direction opposite to the direction of insertion of the housing block 11, as shown in FIG. 2, and the release tool 21 is introduced into the notch 20 of the retaining lance 19 through the recess 15 between the retaining projections 14, and is engaged with the retaining lance 19 to flex and deform the retaining lance 19 (see FIG. 5).

The distal end portion 19a of the flexed retaining lance 19 is spaced apart from the retaining projections 14, thereby releasing the engagement of the housing block 11, and therefore the housing block 11 can be withdrawn without being interfered by the release tool 21.

With the above-mentioned construction of the present invention, the release tool can be easily inserted, and the engagement of the housing block retained in the housing holder can be released with an easy operation. The release tool will not interfere with the withdrawal of the housing block, and therefore the withdrawal of the housing block can be effected easily.

However, since the housing block 11 is retained by a plurality of retaining lances 19, the operation of releasing the retainment with the embodiment described above is cumbersome as well as time-consuming: one retaining lance 19 is driven by one releasing tool 21 to release the engagement of the retaining projections 14; the other retaining lance 19 is driven by the other releasing tool 21 to release the engagement; and it is under this condition that the housing block 11 is taken out of the housing holder 10.

Another embodiment of the present invention has been made in view of the above shortcoming associated with the conventional art.

Figure 8:
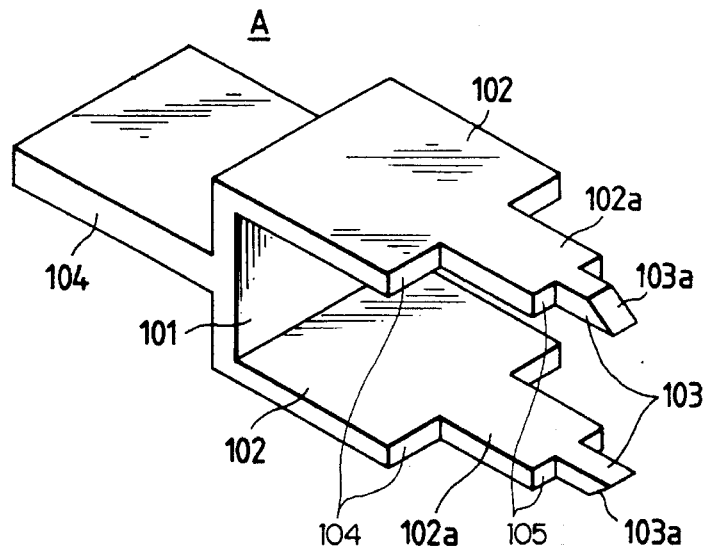
FIG. 8 is a perspective view of another embodiment of the invention.

FIG. 8 shows a retainment releasing tool A of the invention. In the tool A, a pair of releasing plates 102 that confront each other are formed monolithically with a pushing portion 101 so as to be substantially square C-shaped, and retainment releasing projections 103 are provided on distal end portions of the respective releasing plates 102 through guide plates 102a. On the outer surfaces of the retainment releasing projections 103 are tapered drive surfaces 103a. Each of the releasing plates. 102 and the guide plates 102a have stop surfaces 104 land 105, respectively. The function of the stop surfaces 104 and 105 are described below. On the outer surface of the pushing portion 101 is an operation grip 104.

Figure 9:
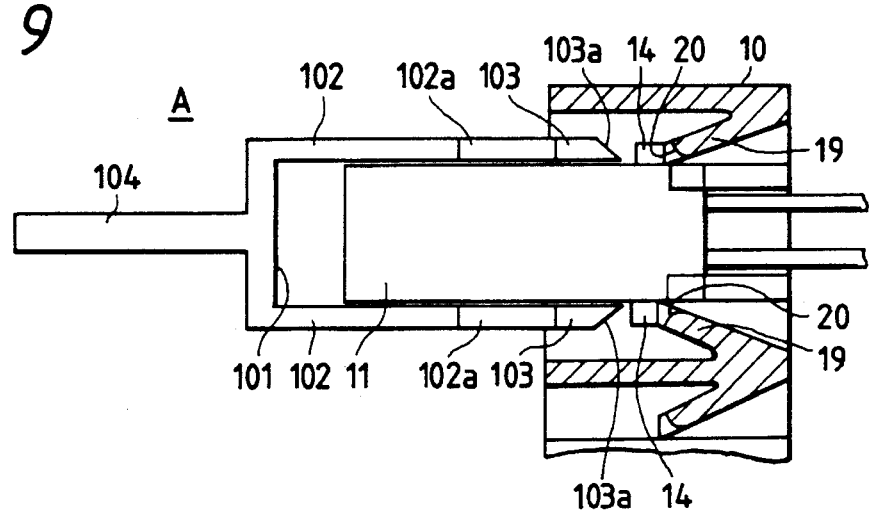
FIG. 9 is a side view showing a state in which the embodiment of FIG. 8 is initially put in use.
Figure 10:
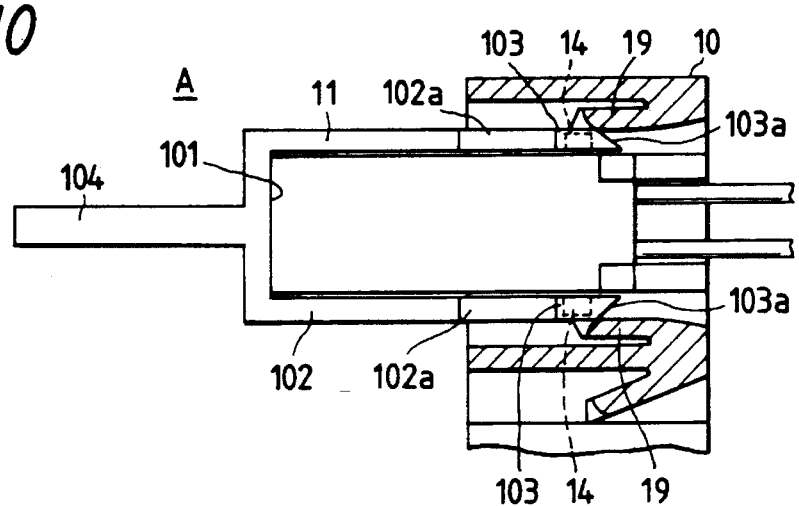
FIG. 10 is a side view showing the manner of releasing the retainment by another embodiment of FIG. 8.

When the thus constructed retainment releasing tool A is pushed in from the front side of a housing block 11 that is in the state shown in FIG. 2 while causing the guide plates 102a, to be engaged with releasing guide grooves 18 formed on both upper and lower surfaces of the housing block 11 (see Fig. 9), the retainment releasing projections 103 not only enter into notches 20 of upper and lower retaining lances 19 through clearances 15 between the retaining projections 14, but also release the engagement of the retaining lances 19 with the retaining projections 14 by pushing the distal end portions 19a of the pair of retaining lances 19 in an upward direction part the retaining projections. The stop surfaces 104 of each of the releasing plates 102 allows only the central distal portion of the releasing plates 102, comprising the guide plates 102a, to enter the releasing guide groove 18. The stop surfaces 105 of each of the guide plates 102a allows only the central distal portion of the guide plates 102a, comprising the releasing projections 103, to enter the notch 20. As retainment releasing projections 103 are pushed further, the pushing portion 101 is abutted against the front face of the housing block 11 and pushes the housing block 11 backward. Even if the retainment releasing tool A is withdrawn under this condition, the distal end portions 19a of the retaining lances 19 come to rest on the retaining projections 14, thus not allowing the distal end portions to be engaged with the retaining projections 14 any longer. Thus, it is thereafter that the wires W are pulled out and the housing block 11 is taken out.

As described in the foregoing, the retainment releasing tool of the second embodiment of the present invention includes: arranging retaining projections that have recesses on both upper and lower surfaces of a housing block that has wired terminals therein; being used in a structure in which when the housing block is inserted into an opening of a housing holder, distal end portions of flexible retaining lances arranged on upper and lower surfaces of the opening of the housing holder become engaged with the retaining projections with notches formed on the distal end portions confronting the recesses; arranging on a pushing portion a pair of releasing plates that confront each other; and arranging retainment releasing projections having tapered drive surfaces on distal end portions of the releasing plates. As a result of the above construction, not only the engagement between the plurality of retaining lances and the housing block can be released simultaneously by a single operation with a single retainment releasing tool, but also the quick operation of pushing the housing block out performed by the retainment releasing tool can prevent re-retainment of the housing block by the restoration of the retaining lances.

What is claimed is:

1. A retainment releasing tool for releasing a pair of retaining lances of an electrical connector housing holder from engagement with a housing block, said tool comprising:

a pair of releasing plates confronting each other, the releasing plates respectively extending from an end of an end plate in a first direction which is substantially orthogonal to the end plate, each releasing plate including a first stop surface and a guide plate at a distal end portion of the releasing plate, said guide plate having a second stop surface at a distal end portion thereof; and a pair of retainment releasing projections extending from the distal end portion of the guide plates, respectively, each retainment releasing projection including a tapered drive surface, wherein said pair of releasing projections operate as means for respectively deflecting said pair of retaining lances out of engagement with said housing block.

2. A retainment releasing tool as claimed in claim 1, further comprising:

an operation rod extending from the end plate in a second direction, said second direction being opposite to said first direction.

3. The retainment releasing tool of claim 1, wherein said end plate is a pushing plate which pushes said housing block after said pair of lances are deflected.

4. An electrical connector assembly, comprising:

a housing block having terminal receiving chambers therein for respectively receiving terminals each having an electric wire connected thereto, said housing block having a pair of retaining projections protruding therefrom and disposed on opposite sides thereof, each of said retaining projections having a recess therein;

a housing holder having a housing block receiving chamber for receiving said housing block, said housing block being insertable into said housing holder in an insertion direction;

a pair of cantilevered flexible retaining lances secured to said housing holder and protruding in an inclined manner into said housing block receiving chamber, said pair of lances respectively engaging said retaining projections upon complete insertion of said housing block into said housing block receiving chamber, each of said cantilevered flexible retaining lances having a notch provided in a distal end thereof in alignment with said recess;

a retainment releasing tool including:

a pair of releasing plates confronting each other, the releasing plates respectively extending from an end of an end plate in a first direction which is substantially orthogonal to the releasing plate, each releasing plate including a guide plate at a distal end portion of said releasing plate; and a pair of retainment releasing projections extending from the distal end portion of the guide plates, respectively, each retainment releasing projection including a tapered drive surface, wherein when said retainment releasing tool is inserted into said housing holder, said pair of retainment releasing projections pass passes through the recesses in said retaining projections and engages the notches of said retaining lances to lift up the distal ends of said cantilevered flexible retaining lances, respectively.

5. A retainment releasing tool as claimed in claim 4, wherein each retainment releasing projection has a thickness substantially equal to a height of said retaining projection.

6. The electrical connector assembly of claim 4, wherein said end plate is a pushing plate which pushes said housing block through said housing holder after said distal ends of said pair of retaining lances are lifted up.

* * * * *